3,827,938
ENZYME PRODUCTS
Knud Aunstrup, Farum, and Otto Andresen, Maalov,
Denmark, assignors to Novo Terapeutisk Laboratorium
A/S, Bagsvaerd, Denmark
Filed May 15, 1972, Ser. No. 253,461
Claims priority, application Great Britain, May 28, 1971,
18,201/71
Int. Cl. C12d 13/10
U.S. Cl. 195—62                                  3 Claims

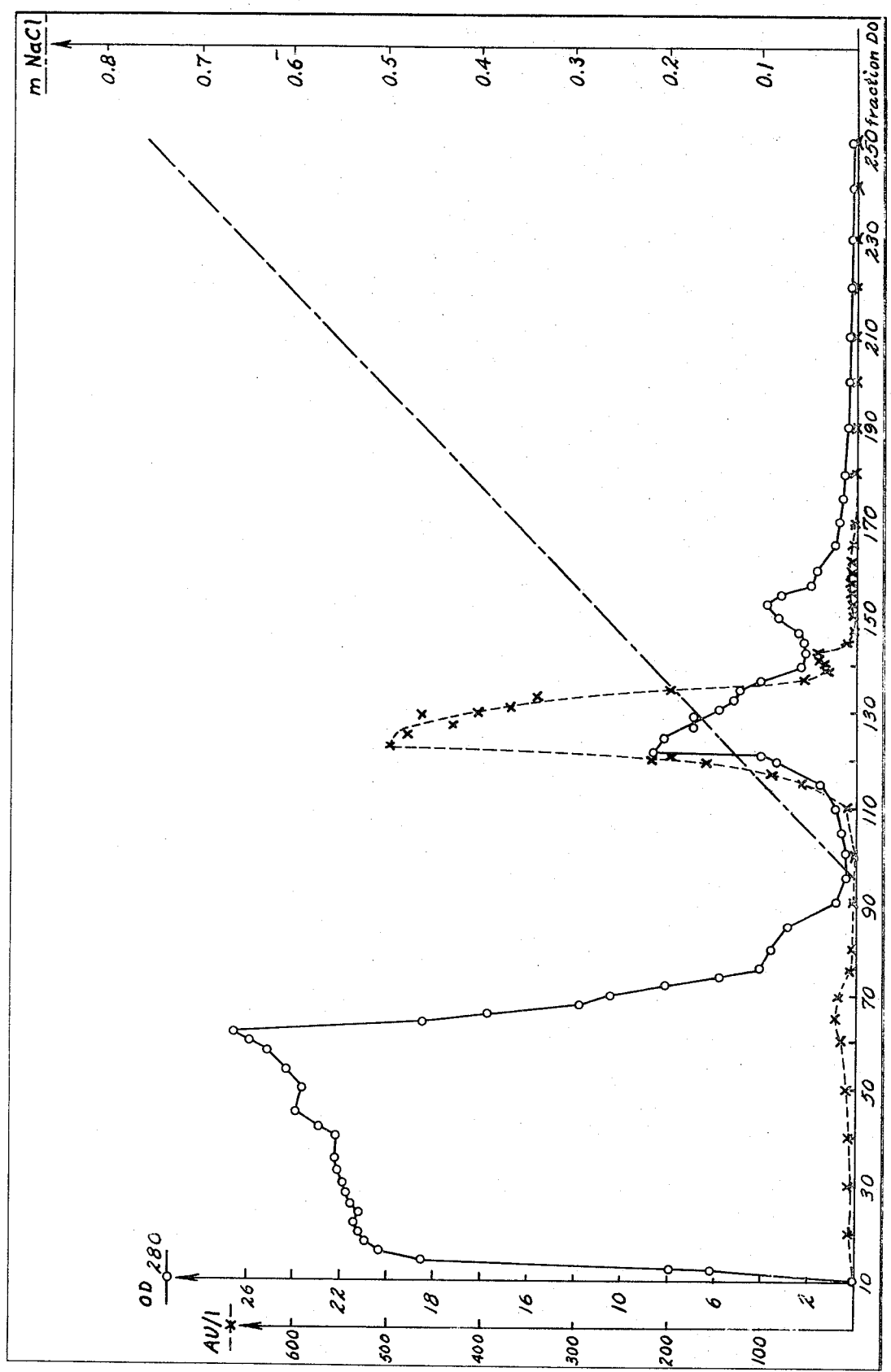

ABSTRACT OF THE DISCLOSURE

An alkaline proteolytic enzyme obtained by submerged aerobic cultivation of the microorgnism Bacillus firmus NRS 783.

---

The present invention relates to a process for the preparation of an enzyme product, enzyme products prepared by the said process and the use of such products in cleaning agents and dehairing products. The term "cleaning agents" encompasses detergents as well as dishwashing agents.

Proteolytic enzymes produced by cultivation of members of the genus Bacillus in suitable nutrient media are widely used in detergents. It is important for the proper functioning of those enzymes that they are active in solutions of detergent, i.e. at pH values in the range of from 9 to 11 and in the presence of sequestering agents, surfactants, and in some cases, sodium perborate.

It is furthermore important for the economy of the process that the enzyme can be effectively used in as low a concentration as possible.

According to the present invention it has now been found that the microorganism of Bacillus firmus, strain NRS 783, when cultivated under suitable conditions will form a proteolytic enzyme composition which is particularly well suited for use in detergents, where it will result in a surprisingly high cleaning value at a very low concentration.

Bacillus firmus strain NRS 783 may be obtained from U.S. Department of Agriculture, Agricultural Research Service, Northern Utilization Research and Development Division, 1815 N. University St., Peoria, Ill. 61604, U.S.A., as strain NRRL No. B 1107.

In order to produce the proteolytic enzyme Bacillus firmus NRS 783 is cultivated under aerobic conditions in a nutrient medium containing assimilable carbon and nitrogen together with other essential nutrients—the medium being composed in accordance with the principles of the known art.

Suitable carbon sources are carbohydrates, such as saccharose, glucose and starch, or carbohydrate containing materials such as cereal grains, malt, rice and sorghum. The carbohydrate concentration incorporated in the medium may vary widely, e.g. up to 25% and down to 1–5%, but usually 8–10% will be suitable, the percentages being calculated as dextrose.

The nitrogen source in the nutrient medium may be of inorganic and/or organic nature. Suitable inorganic nitrogen sources are nitrates and ammonium salts. Among the organic nitrogen sources quite a number are regularly used in fermentation processes involving the cultivation of bacteria. Illustrative examples are soybean meal, cotton seed meal, peanut meal, casein, corn steep liquor, yeast extract, urea, and albumin. In addition the nutrient medium should also contain the usual trace substances.

The temperature at which the cultivation is usually carried out is within the range normally employed for the cultivation of species of the genus Bacillus. The temperature is preferably 30 to 40° C. As the cultivation has to be carried out under aerobic conditions, it is necessary to make use of artificial aeration, when growing the bacteria in fermentation tanks. The amount of air used is similar to that used in conventional cultivation processes.

It is generally preferred to perform the cultivation at alkaline pH values. This may be obtained by the addition of suitable buffers, such as sodium carbonate or a mixture of sodium carbonate and sodium bicarbonate after sterilization of the medium.

After fermentation, liquid enzyme preparations may be produced by removal of coarse material from the broth or, if desired, concentration of the broth by evaporation at low temperature or by reverse osmosis. Finally preservatives may be added to the broth.

Solid enzyme preparations may be prepared from the purified and/or concentrated broth by precipitation with salts, such as $Na_2SO_4$ or with water miscible solvents, such as ethanol or acetone; removal of the water in the broth by suitable drying methods such as spray-drying may also be employed.

The invention is further illustrated in the following examples.

EXAMPLE I

Bacillus firmus NRS 783 was cultivated at 30° C. on a rotary shaking table (220 r.p.m.) in 500 ml. baffled Erlenmeyer flasks containing 100 ml. medium of the composition given below. After 6 days of incubation the proteolytic activity of the culture was determined using the Anson hemoglobin method, where pH of the substrate was adjusted to the appropriate value with NaOH (J. Gen. Physiol; 22, 79 (1939)). Unless otherwise stated in the following, the proteolytic activity is measured according to this method.

Composition of the medium in grams per litre:

| | |
|---|---|
| Potato starch | 40 |
| Ground barley | 100 |
| Soybean flour | 30 |
| $CaCO_3$ | 5 |
| Soybean oil | 0.5 |

The starch in the medium is liquified with alpha-amylase and the medium is sterilized by heating at 120° C. for 45 minutes.

After sterilization, pH of the medium is adjusted to 9.7 by addition of 10% of a 1 M solution of sodium sesquicarbonate.

After cultivation, the enzyme activity of the broth determined at pH 7.5 was 50 AU./l. (Anson units per litre).

EXAMPLE II

A pure enzyme preparation was prepared as follows:

A fermented culture broth prepared as described in Example I was centrifuged. By precipitating from the supernatant with $Na_2SO_4$, a crude enzyme product with an enzyme activity of 2.34 AU./g. was obtained. This crude precipitate was redissolved, precipitated with acetone and dialyzed. The enzyme preparation was chromatographed on a CM–52 ion exchange column, elution being carried out with a $10^{-3}$ molar tris-maleate buffer containing $2 \times 10^{-3}$ molar calcium acetate and with a pH of 6.5. Reference is made to the attached drawing from which it may be seen that the elution with a linear NaCl gradient yielded the activity peak, which was collected in fractions No. 115 to 140. The combined fractions were dialyzed and freeze dried, whereby a salt free preparation with a low peptide content and an activity of 71.5 AU./g. appeared.

The characteristics of the preparation prepared according to Example 2 were then determined.

The relationship between activity and pH was determined in the following ways:

(a) The substrate was urea denatured hemoglobin. The previously mentioned Anson method was used as the method of analysis. The pH interval between 7 and 12 was investigated, the pH of the substrate being adjusted with 1 N NaOH or 1 N HCl tot he proper value. The pH activity optimum was found to be about 9 as can be seen from the following table which, for comparison reasons, also includes the corresponding values for substilisin Carlsberg and an enzyme according to British Pat. No. 1,243,784.

| pH | 7 | 8 | 9 | 10 | 11 | 12 |
|---|---|---|---|---|---|---|
| Percent activity of maximum, subtilisin Carlsberg | 93 | 98 | 100 | 96 | 84 | 66 |
| Percent activity of maximum, enzyme according to British Pat. No. 1,243,784 | 65 | 94 | 99 | 99 | 97 | 93 |
| Percent activity of maximum, enzyme according to the invention | 65 | 97 | 100 | 94 | 85 | 76 |

(b) The substrate was casein, and the method of analysis was a modification of the method described by Tsuru et al. (Agr. Biol. Chem., 30, 652 (1966)). The casein which is utilized in this and in the following tests is Hammarsten casein. The method was as follows:

Substrate:
10 ml. of a 1% solution of casein in Britton and Robinson Universal buffer (J. Chem. Soc., 1931, p. 1456) adjusted to the appropriate pH value.
2 ml. distilled water.

The mixture is preheated at 40° C. in a water bath for 10 minutes; then 2 ml. of enzyme solution is added and after 30 minutes of reaction time at 40° C. undegraded protein is precipitated by the addition of 5 ml. of 10% trichloroacetic acid. After 10 minutes standing at 40° C. to complete the precipitation, the precipitate is removed by filtration through a Whatman filter No. 42 and the optical density of the filtrate is read at 276 nm. against a blank which is prepared in the same way except that trichloroacetic acid is added to the substrate before the enzyme.

The optical density is used directly to express the proteolytic activity.

For comparison reasons the pH activity values for subtilisin Carlsberg and an enzyme prepared according to British Pat. No. 1,243,784 were determined concurrently. The pH activity values appear in the following table, from which it appears that the enzyme according to the invention had a pH activity optimum of 11.0 and that subtilisin Carlsberg had a pH activity optimum of 10.5.

| pH | 7 | 8 | 9 | 10 | 10.5 | 11 | 12 |
|---|---|---|---|---|---|---|---|
| Percent activity of maximum, subtilisin Carlsberg | 47 | 59 | 70 | 94 | 100 | 93 | 5 |
| Percent activity of maximum, enzyme according to British Pat. No. 1,243,784 | 39 | 51 | 57 | 61 | 62 | 76 | 100 |
| Percent activity of maximum, enzyme according to the invention | 24 | 41 | 55 | 74 | 89 | 100 | 62 |

The relationship between activity and temperature was determined in the following ways:

(a) The substrate was urea denatured hemoglobin. The previously mentioned Anson method was used as the method of analysis. The temperature interval investigated was 25–80° C. and the pH was 7.5. The temperature optimum was found to be 50° C., as can be seen from the following table:

Temperature:            Percent of maximum
25 ---------------------------------------- 27
40 ---------------------------------------- 67
50 ---------------------------------------- 100
60 ---------------------------------------- 41
70 ---------------------------------------- 18
80 ---------------------------------------- 9

(b) The hemoglobin substrate was prepared according to the aforementioned article in the Journal of General Physiology, but excluding urea. When the phosphate buffer is added, some of the hemoglobin is precipitated. This precipitate is removed by filtration and the resulting filtrate is used as the substrate. The Anson method was used as the method of analysis. The temperature interval investigated was 25–80° C., and the pH was 7.5. The temperature optimum was found to be 60° C. which can be seen from the following table in which, for comparison the corresponding values for an enzyme prepared according to British Pat. No. 1,243,784 are included:

| Temperature | 25 | 40 | 50 | 60 | 70 | 80 |
|---|---|---|---|---|---|---|
| Percent of maximum, enzyme according to British Pat. No. 1,243,784 | 10 | 26 | 40 | 70 | 100 | 30 |
| Percent of maximum, enzyme according to the invention | 16 | 43 | 61 | 100 | 30 | 13 |

The relationship between stability and pH was determined in the following way:

The enzyme preparation according to Example II was dissolved in deionized water with added Britton and Robinson buffer (J. Chem. Soc., 1931, p. 1456) in a concentration of 0.5 mg./100 cm.$^3$. This solution was kept for 10 minutes at 60° C. at pH values between 4 and 12 and then analyzed according to the Anson method. The pH stability optimum was found to be about 6, as can be seen from the following table:

pH:                       Percent of maximum
4 ---------------------------------------- 6
5 ---------------------------------------- 98
6 ---------------------------------------- 100
7 ---------------------------------------- 96
8 ---------------------------------------- 89
9 ---------------------------------------- 61
10 ---------------------------------------- 7
11 ---------------------------------------- 0
12 ---------------------------------------- 0

The temperature stability was determined in the following way:

The enzyme preparation according to Example II was dissolved in 0.118 molar borate buffer in a concentration of 0.25 mg./100 cm.$^3$ and kept for 10 minutes at pH 10 at different temperatures. The temperature interval investigated was 30–70° C. and the Anson method was the method of analysis. It turned out that the enzyme is stable up to 50° C., it being understood that stable means a residual activity greater than 80%. At 70° C. the residual activity was 0. Addition of 0.005 molar $CaCl_2$ stabilized the enzyme to the extent that the residual activity of the enzyme at 70° C. was more than 60%.

The stability in the presence of urea was determined in the following way:

The enzyme preparation according to Example II was dissolved in 6 molar urea at pH 7.5 in a concentration of 0.125 mg./100 cm.$^3$ and left standing for 30 minutes. Experiments were performed at 25, 40 and 50° C. The Anson method was the method of analysis. The residual activities at the different temperatures appear below in the following table:

Temperature, ° C.:         Residual activity, percent
25 ---------------------------------------- 96
40 ---------------------------------------- 68
50 ---------------------------------------- 5

Inhibition of the enzyme in the presence of various chemical compounds was investigated in the following manner:

To a solution of 2 mg. of the enzyme preparation according to Example II in a litre of a $10^{-3}$ molar trismaleate buffer at pH 6.5 was added ethylene diamine tetraacetic acid (EDTA) in an amount corresponding to a concentration of 0.01 molar. The proteolytic activity was determined according to the Anson method, and it turned out that EDTA did not inhibit the enzyme at all.

To a solution of 2 mg. of the enzyme preparation according to Example II in 1 litre of 1/15 molar phosphate buffer at pH 7.5 was added a tenfold excess on a molar basis of phenyl methyl sulphonylfluoride (PMSF). The proteolytic activity was determined according to the Anson method and it turned out that PMSF exhibited a totally inhibiting effect on the enzyme. This shows that the enzyme acc. to the invention is a serine type proteinase, having serine in its active center.

A solution of 0.32 mg. of the enzyme preparation according to Example II in 100 ml. of a 0.2% solution of sodium tripolyphosphate, the pH of which was adjusted to 10, was kept at 50° C. for 30 minutes and it turned out that the residual activity was 3%. It is highly surprising that the washing efficiency as shown hereinafter is excellent in spite of the fact that the enzyme as shown above is inactivated after exposure to sodium tripolyphosphate, which is a common ingredient of detergents. No attempts have been made to explain this apparent contradiction.

The esterase activities were determined in the following way:

The analyses were performed according to the pH stat method, at pH 8.0 and at 30° C.

The following substrates were used:

N-acetyl-L-tyrosine ethylester (ATEE)
N-benzoyl-L-arginine-ethylester (BAEE)
N-tosyl-L-arginine methylester (TAME)
N-benzoyl-L-leucin-ethylester (BLEE).

The concentrations of the substrates were as follows:

ATEE: 0.02 molar in 0.092 molar KCl in water containing 8% dioxan
BAEE: 0.015 molar in 0.43 molar KCl in water
TAME: 0.02 molar in 0.092 molar KCl in water containing 8% dioxan
BLEE: 0.0075 molar in 0.066 molar KCl in 30% ethanol.

The activities of the enzyme expressed as esterase units/mg. enzyme preparation according to Example II where 1 esterase unit corresponds to $1\mu$ substrate hydrolyzed per minute, are as follows:

ATEE: 62 esterase units/mg.
BAEE: 0.741 esterase units/mg.
TAME: 0.730 esterase units/mg.
BLEE: 13.7 esterase units/mg.

In order to demonstrate the uniqueness of the enzyme, a comparison with some known enzymes is shown in the following table:

| Enzyme | Esterase units/Anson units | | |
|---|---|---|---|
| | Subtilisin Carlsberg | Enzyme according to British Pat. 1,243,784 | Enzyme according to the invention |
| Substrate: | | | |
| ATEE | 15,700 | 785 | 1,105 |
| BAEE | 523 | 143 | 10 |
| TAME | 494 | 156 | 10 |
| BLEE | 231 | 47 | 244 |

The Michaelis constant is determined in the following ways:

ATEE is used as substrate. The determination is carried out by the pH-stat method at pH 8.0 and at 30° C.

The initial velocities V are calculated on the basis of the slope of the straight line portion of the curve, which is drawn by the titrigraph.

$v$ is determined at the following substrate concentrations $S:S=0.022, 0.015, 0.0074$ and $0.0037$ molar ATEE. From the Lineweaver-Burk plot the Michaelis constant is found:

$$Km = 3 \times 10^{-2} \, M$$

The Michaelis constant is also determined with hemoglobin as the substrate. The determination is carried out according to the Anson method, at pH 7.5 and 25° C. The initial velocities $v$ are determined in the following manner. For each substrate concentrations S, $OD_{750}$ is determined as a function of the reaction time. $v$ is the slope of the tangent to the curve $OD_{750}$ versus reaction time in the point of origin. $v$ is determined at the following substrate concentrations $S:S=0.35, 0.26, 0.21, 0.175, 0.150$ and $0.130\%$ hemoglobin. From a a Linewaver-Burk plot the Michaelis constant is found:

$$Km = 0.2\% \text{ hemoglobin}$$

The proportion between large and small peptide molecules in the decomposition products from casein is determined in the following way:

A 3% casein solution is digested completely at pH 8 (the buffer is 0.05 molar borate/0.2 molar NaCl) and at 50° C. for 3 hours by means of the enzymes listed below. The reaction mixture is gel filtered on Sephadex G-25 superfine. The fractions are collected and the amount of peptides in each fraction is determined spectrophotometrically with ninhydrin.

The distribution between large and small peptides is stated below, the large peptides being defined as peptides with a molecular weight greater than 1000 and the small peptides being defined as peptides with a molecular weight smaller than 1000.

| Enzyme | Large peptides, as approximate percentage of total peptides | Small peptides, as approximate percentage of total peptides |
|---|---|---|
| Enzyme according to the invention | 83 | 17 |
| Enzyme according to British Pat. No. 1,243,784 | 46 | 54 |
| Subtilisin Carlsberg | 54 | 46 |
| Trypsin | 72 | 28 |

The molecular weight is determined in the following ways:

By ultracentrifugation the sedimentation constant is determined to about 3.0 Svedberg. The specific volume is 0.72 cm.$^3$/g. and the diffusion coefficient is about $$10 \times 10^{-7}$$

cm./sek.$^2$ The approximate molecular weight was calculated to 26,000.

The molecular weight is also determined by gel filtration on a column with the dimensions 2.5 cm. x 45 cm. packed with Sephadex G-75 superfine. The column was calibrated with Blue Dextran 2000 (molecular weight $2 \times 10^6$), Cytochrome c (molecular weight 13,000) and $K_2CrO_4$ (molecular weight 194). The buffer was 0.1 molar tris/1.0 molar NaCl, ph 8.0. The flow rate was 11 ml./hour. The approximate molecular weight was determined to 26,000.

The approximate value of the isoelectric point determined by "moving boundary" electrophoresis according to A. Tiselius was pI=11.0.

The buffer used in the determination is described in G. L. Miller and R. H. Golder, Arch. Biochem., vol. 29, pp. 420–423 (1950).

Other data in connection with the enzyme preparation according to Example II were determined as follows:

The extinction coefficient $E_{279 \text{ nm.}}^{1\%, 1 \text{ cm.}} = 11.5$

By means of an active center titration with N-trans-cinnamoyl imidazole according to Bender et al. (J. Amer. Chem. Soc., 88, p. 5890 (1966)), and under the supposition of a molecular weight of 26,000, the purity of the product was determined to 63% corresponding to a maximal obtaintable specific activity of 114 AU./g.±10 AU./g.

Some additional determinations were carried out in connection with the preparation prepared according to Example II, and the results of these determinations are shown in the following.

The elementary analysis carried out on the enzyme preparation according to Example II showed the following results: C, 46.3%; H, 7.2%; N, 15.6%; S, 0.4%.

The amino acid composition was determined. This amino acid composition appears from the following table, in which for comparison, the amino acid composition for some enzymes known in the art are listed. It is to be understood that the accuracy of the determination in connection with the enzyme according to the invention is the normal ±10%.

| | Subtilisin Carlsberg [1] | B.amylo saccharicus [2] | British Pat. 1,243,784 | The invention |
|---|---|---|---|---|
| Amino acid composition: | | | | |
| Lysin | 9 | 6 | 2 | 4 |
| Histidin | 5 | 5 | 4 | 6 |
| Ammonia | 25 | | 23 | |
| Arginin | 4 | 3 | 8 | 6 |
| Aspartic acid | 28 | 20 | 25 | 23 |
| Threonin | 19 | 14 | 13 | [3] 14 |
| Serine | 32 | 37 | 22 | [3] 22 |
| Glutamic acid | 12 | 12 | 11 | 14 |
| Proline | 9 | 10 | 6 | 12 |
| Glycine | 36 | 25 | 24 | 30 |
| Alanin | 42 | 27 | 23 | 32 |
| Cystin 1/2 | 0 | 0 | 0 | 0 |
| Valin | 31 | 20 | 12 | 21 |
| Methionin | 5 | 3 | 2 | 2 |
| Isoleucin | 10 | 12 | 11 | 7 |
| Leucin | 16 | 12 | 11 | 16 |
| Tyrosin | 13 | 9 | 9 | [3] 6 |
| Phenylalanin | 4 | 2 | 3 | 2 |
| Tryptophan | 1 | 3 | 2 | |
| Molecular weight | 27,300 | 22,700 | 20,000 | 26,000 |

[1] R. J. Delange, E. L. Smith, J. Biol. Chem. 243, 2134 (1968).
[2] U.S. Pat. No 3,622,458.
[3] Not corrected for loss due to hydrolysis.

Acid disc electrophoresis data were obtained in the following manner:

The electrophoresis was carried out with a Reisfeld system 8 with 7.5% gel and at pH 4.3. The gel was fixated for 30 minutes with 12.5% trichloroacetic acid, and the dyeing was carried out for 24 hours with Coomassie brilliant blue.

For comparison reasons experiments were performed with different enzymes, as shown in the following table:

| Enzyme | Amount of enzyme, μg. | Distance from boundary between upper and lower gel to middle of protein band, cm. |
|---|---|---|
| Enzyme preparation according to Example II | 50 | 2.72 |
| Crystalline subtilisin Carlsberg | 50 | 1.70 |
| Crystalline subtilisin NOVO | 50 | 2.06 |

All discs only exhibited one band, indicated a high purity of the enzymes.

As can be seen from the above table, the proportions between the distances appearing in the last column of the table are as follows:

$$\frac{\text{Distance, enzyme acc. to the invention}}{\text{Distance, subtilisin Carlsberg}} = 1.60$$

$$\frac{\text{Distance, enzyme acc. to the invention}}{\text{Distance, subtilisin NOVO}} = 1.32$$

Other acid disc electrophoresis experiments have been carried out. Although the values of the distances appearing in the last column of the above table may vary from experiment to experiment, it was found that the above mentioned proportions are approximately the same in all cases.

In order to demonstrate the extraordinary utility of the proteolytic enzyme as a detergent additive, some washing tests were performed with artificially soiled fabrics.

The soiled fabrics used in the test were EMPA 116 swatches commonly used in washing tests. They are produced and sold by Eidgenössische Materialprüfungs-und Versuchsanstalt, Saint Gall, Switzerland.

The various enzyme preparations were evaluated by washing tests in the laboratory by means of a one step washing method carried out in a Launder-Ometer, which is a well-known standard model washing apparatus.

In the procedures the detergent compositions used were formulated so as to simulate a heavy-duty detergent powder as used in Europe.

The test conditions generally were as follows:

(1) Stained fabric:

Size of swatches _____ 3.7 x 7.3 cm.
Number of swatches per wash _____ 5 (=3 grams in total).

(2) Washing conditions:

Apparatus _____ Launder-Ometer.
Volume of washing solution _____ 300 ml.
Washing time _____ 33 minutes.
Temperature _____ 25° C. to 90° C.
Detergent concentration _____ 5 g./liter.
Water hardness _____ 10° German hardness.

After the washing procedure, the test swatches were rinsed, ironed and the final reflectance reading was taken with the Elrepho reflection photometer with magnesium oxide as the 100% whiteness standard. Illumination: incandescent lamp. Filter: R-46.

In the washing test a detergent with the following composition was used:

|  | Percent by weight |
|---|---|
| Linear alkyl benzene sulphonate | 11.0 |
| Soap | 3.0 |
| Sodium carboxy methyl cellulose | 1.0 |
| Sodium EDTA (Na$_4$ salt) | 0.18 |
| Sodium silicate | 7.0 |
| Sodium tripolyphosphate | 38.0 |
| Sodium perborate, tetrahydrate | 25.0 |
| Sodium sulphate and water, balance to 100.0% by weight. | |

As the enzymes were used the previously mentioned proteolytic enzyme prepared according to Example II and as comparison an enzyme according to British Pat. No. 1,243,784. The pH after wash was 9.6.

The results of the above mentioned test are compiled in the following table. The figures are the total final reflection values indicated by R. The values of the differences between the reflection values of the enzymatic detergents and the same detergent system without the proteolytic enzyme have been calculated and are indicated by ΔR. The proteolytic activity is expressed in Anson units (AU.). F is the improvement factor in comparison with one of the best, already known alkaline, proteolytic enzymes.

WASHING TEST

| Enzyme | AU. per litre | R | ΔR | F |
|---|---|---|---|---|
| No enzyme | 0.00 | 16.4 | | |
| Enzyme according to the invention | 0.02 | 26.7 | 10.3 | 1.72 |
|  | 0.04 | 31.0 | 14.6 | 1.85 |
|  | 0.06 | 33.2 | 16.8 | 1.73 |
| Enzyme according to British Pat. No. 1,243,784 | 0.02 | 22.4 | 6.0 | |
|  | 0.04 | 24.3 | 7.9 | |
|  | 0.06 | 26.1 | 9.7 | |

Furthermore, around ten similar washing tests have been performed using different proteolytic preparations of technical grade with activities between about 2 and 5 AU./g. It turned out that the improvement factor F in all cases had a value betwen 1.70 and 2.10.

What is claimed is:

1. The alkaline proteolytic enzyme produced by submerged cultivation of the microorganism of *Bacillus firmus*, strain NRS 783 in a culture medium containing suitable carbon and N-sources, and recovered from the cultivation broth.

2. Procedure for preparation of an alkaline proteolytic enzyme which comprises cultivating the organism of *Bacillus firmus*, strain NRS 783 aerobically under submerged conditions, in a culture medium containing suitable carbon and N-sources, thereafter recovering the enzyme from the cultivation broth.

3. Procedure for preparation of the alkaline proteolytic enzyme according to claim 2, wherein the cultivation is carried out between 30 and 40° C., and at alkaline conditions.

References Cited

UNITED STATES PATENTS

| 3,723,250 | 3/1973 | Aunstrup et al. | 195—62 |
| 3,674,643 | 7/1972 | Aunstrup et al. | 195—62 |
| 3,622,458 | 11/1971 | Murao et al. | 195—62 |
| 3,622,459 | 11/1971 | Mitsugi et al. | 195—66 R |
| 3,576,719 | 4/1971 | Murao | 195—62 |
| 3,652,399 | 4/1972 | Isono et al. | 195—62 |

LIONEL M. SHAPIRO, Primary Examiner

U.S. Cl. X.R.

195—65